United States Patent [19]

Westfall

[11] Patent Number: 5,265,844
[45] Date of Patent: Nov. 30, 1993

[54] RECEPTACLE VALVE ASSEMBLY AND SEAL

[76] Inventor: Randell W. Westfall, 8215 River Glade, Houston, Tex. 77095

[21] Appl. No.: 970,062

[22] Filed: Nov. 2, 1992

[51] Int. Cl.⁵ ............................................. F16L 37/28
[52] U.S. Cl. ................................ 251/149.1; 251/149.6; 251/333; 62/50.7
[58] Field of Search ............... 251/149.1, 149.3, 149.4, 251/149.6, 333; 137/614, 614.02, 614.04; 62/50.7

[56] References Cited

U.S. PATENT DOCUMENTS 3,378,225  4/1968  Snyder, Jr. ..................... 251/149.6
3,567,255  3/1971  Evans ........................... 251/149.6 X

*Primary Examiner*—Martin P. Schwadron
*Assistant Examiner*—Kevin L. Lee
*Attorney, Agent, or Firm*—Keeling & Assoc.

[57] ABSTRACT

A valve receptacle is disclosed, the valve providing a fluid seal when the valve is closed at atmospheric temperatures and at temperatures encountered as a result of exposure to cryogenic fluids. The valve receptacle comprises a valve receptacle housing; a seal piston disposed within the receptacle housing; a projecting flange of the seal piston engaging a seal inclined surface; and a seal piston guide comprising a first hollow cylinder and a second hollow cylinder interior of the first hollow cylinder, and a connecting member connecting the hollow cylinders. The piston rod is slidably moveable within the interior hollow cylinder. Abutment of a piston rod shoulder with the inner hollow cylinder limits the extent of lateral movement of the piston seal.

12 Claims, 1 Drawing Sheet

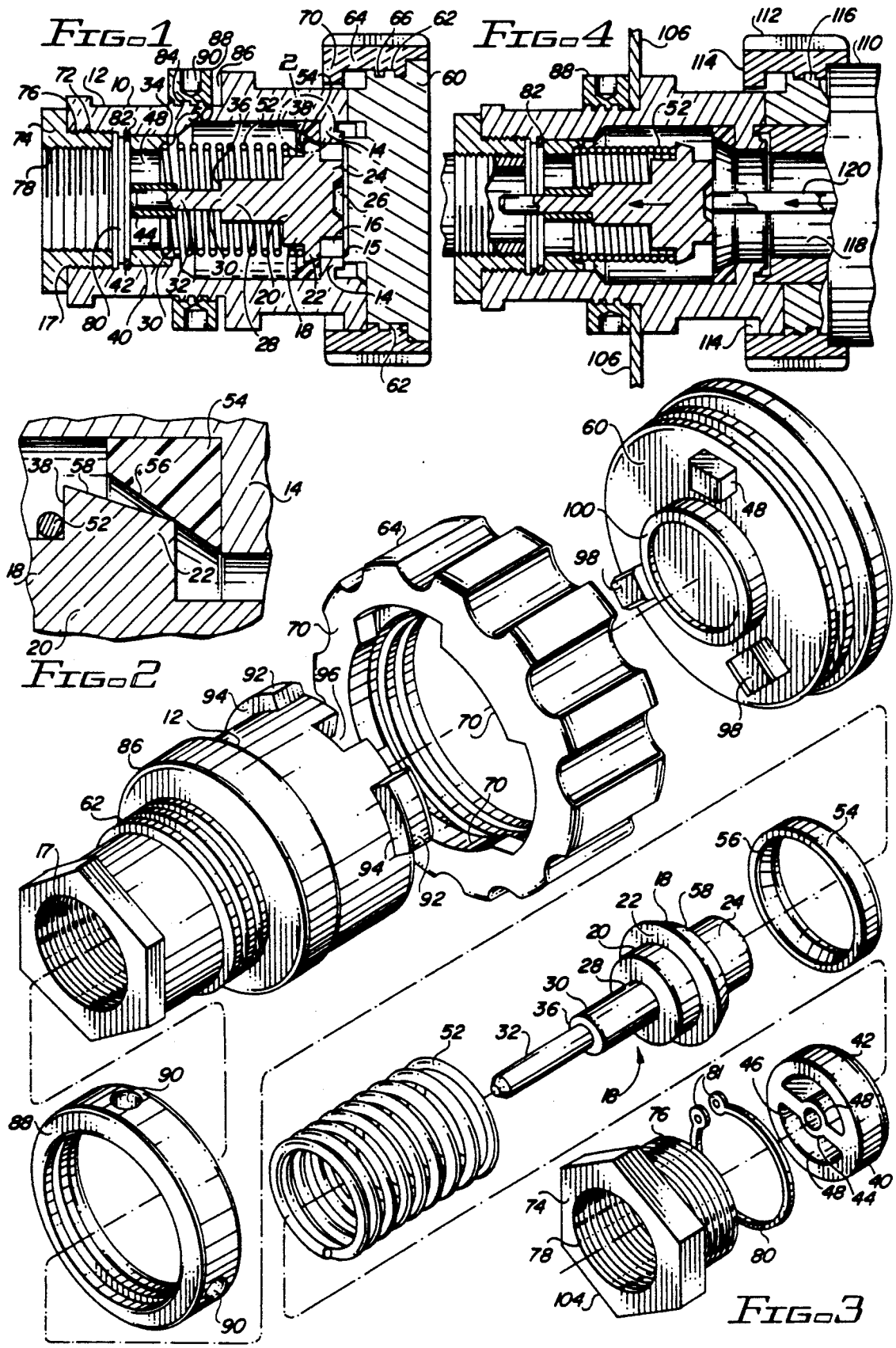

RECEPTACLE VALVE ASSEMBLY AND SEAL

BACKGROUND OF THE INVENTION

This invention relates to the field of receptacle valve assemblies and more particularly to the field of valve assemblies for cryogenic fluids including liquified natural gas.

With the advent of liquified natural gas (hereafter "LNG") as a fuel for vehicles, a necessity has arisen to provide for relatively quick fueling of vehicles. It should be noted that the LNG used to fuel vehicles typically comprises approximately 99% methane, a higher percentage of methane than is present in unrefined liquified natural gas. A limiting factor in conventional fueling operations is the speed and safety by which liquified natural gas may be transferred from storage tanks to vehicle tanks. The limitations result in large part from the temperatures, typically below zero (−259° Fahrenheit), at which the fueling of vehicles is accomplished and from the volatility of LNG vapors. Hoses and couplings are conventionally used in the transfer of LNG.

Existing couplings incur problems when receptacle valve components shrink due to extreme temperature reduction as LNG flows through the coupling. Leakage around the seal and formation of ice from water vapor may result. In some applications, ice ultimately freezes the connection preventing the operator from disconnecting the fuel coupling until the coupling thaws.

Adaptation of known and commercially practical valve assemblies to the requirements of LNG fueling have not been fully successful due to the extreme temperature variations imposed on valves and seals.

A summary prepared by Houston Metropolitan Transit Authority ("Houston Metro") based on its survey of fueling couplings indicates that current designs for a less hazardous, yet relatively quick transfer fuel coupling design include products developed by Gibson Technical Services, Cryopak, Minnesota Valley Engineering, and Parker Hannifin. A synopsis of a summary made by Houston Metro follows:

a. The Gibson design involves a coupling using a bayonet connection for the female dispenser which is attached to the end hose and slides over the male receptacle on the vehicle. TEFLON o-rings and dynamic face seals secure the connection. Liquid flows through the inner orifice into the vehicle's fuel tank while methane vapor is removed from the annular space of the outer orifice space.

b. The Cryopak design involves a fuel coupling shaped similar to a common gasoline fuel nozzle with the exception that two parallel orifices extend from the handle. One orifice delivers LNG and the other orifice retrieves vapor.

c. Minnesota Valley Engineering couplings are designed to be connected with a quarter turn rotation. In-line poppet valves open upon contact allowing liquid to flow.

d. Parker Hannifin and Minnesota Valley Engineering have developed a fuel coupling designed to be connected with a quarter turn rotation. The operator opens in-line poppet valves with a manual lever, which lever cannot be actuated unless the coupling is securely connected. Parker Hannifin Corporation product bulletin for Part No. 1169-61 discloses a form of valve receptacle.

The following U.S. Patents offer insight as to the art of fuel transfer valves although the disclosures are not designed for cryogenic applications. It should be noted in relation to the art referenced, that the art of valve design is wide spread and prolific.

Laughtner U.S. Pat. No. 3,318,346 discloses a container adapted to contain a combustible gas and adapted to be filled with a combustible gas from a pressurized tank. The container includes an aperture, pressure-responsive non-return valve means comprising a hollow tubular member slidably arranged in the aperture and having end portions respectively located within and without the container for placing the interior of the container in communication with the interior of a pressurized tank. The non-return valve means opens only in response to an increase in the pressure within the hollow tubular member, said hollow tubular member being slidable from a normal inactive position into an active position deeper into the container.

Pichl U.S. Pat. No. 3,295,567 discloses a filling valve of a fuel tank of a gas fuel lighter, said valve comprising a valve housing, a valve body moveable in said housing open between a valve closing position and a valve open position, yieldable means biasing the valve body into its valve closing position, an elastic annular sealing member disposed within the housing opening between the inner wall portion of the housing and the valve body to define an entrance throat for the insertion of a fuel container. The sealing member includes an annular disk having a deformable flange to form an annular seal between the neck and valve body.

Zellweger U.S. Pat. No. 3,085,601 discloses a gas fueled lighter valve including a fixed member, a movable member, and a sealing member and containing two passages, one being an inlet passage for liquified gas and the other being an exhaust passage to put the fuel reservoir in communication with the atmosphere, the valve being actuated by the connecting member of a refill vessel.

Labat U.S. Reissue Pat. No. 26,193 describes a filling arrangement for a liquified gas lighter comprising in combination a supply valve on the gas supply cylinder and a lighter valve in the wall of the tank of the lighter, each valve being spring operated for opening and closing and each provided with a projecting stem, the two stems coming into contact with each other to produce opening of the two valves, the spring of the gas supply cylinder valve being more powerful than that of the lighter valve. The lighter has an escape valve independent of the filling valve.

Brightenstein U.S. Pat. No. 3,035,617 discloses a fuel transfer adapter with dual valve actuator for use in fueling cigarette lighters, comprising a valve actuating adapter stem having a charging port with a pin operated valve located interiorly thereof, for pressurized fuel canisters having a nipple with a concealed valve therein, the adapter comprising a body having a coupling part with a coupling bore adapted to engage the canister nipple and an elongated nozzle extending from said body with a second bore communicating from said coupling bore through the tip of the coupling nozzle. The second bore extends into the nozzle through the outer tip end of the nozzle. A trigger pin is provided in the second bore, said trigger pin having an opposite inner end extending into the coupling bore with a coupling seal provided in the coupling bore. The trigger pin may be shifted longitudinally, the trigger pin being adapted to actuate respective valve means of a lighter and canister to which the adapter is coupled.

Drager, et al. U.S. Pat. No. 3,530,905 discloses a vaporizer for a anesthetic including a filling and emptying means therefore, said filling and emptying means including a cylinder coupling means. The cylinder coupling means is designed for receiving a male coupling connection on a flexible conduit. The coupling means includes a valve activated by the male coupling means.

The existing art does not teach a quick connect, quick fueling, and freeze resistant valve for cryogenic applications providing for efficient, safe transfer of LNG in a commercial application.

SUMMARY OF THE INVENTION

It is therefore an object of the present invention to provide a valve for transfer of cryogenic fluids utilizing an improved seal.

It is an object of this invention to provide an effective valve for transfer of cryogenic fluids that may be connected and disconnected relatively easily.

It is an object of the present invention to provide a transfer valve receptacle resistant to freezing during transfer of cryogenic fluids.

It is an object of the present invention to provide a valve for the transfer of cryogenic fluids providing for relatively fast transfer of cryogenic fluid.

The foregoing and other objects of the present invention are revealed in the specifications and claims set forth herein.

The foregoing and other objects of the present invention are accomplished by a valve receptacle comprising a valve receptacle housing, said valve receptacle housing comprising a generally hollow, generally cylindrical member, said valve receptacle housing including exterior connection means for connecting the valve receptacle housing to a tank wall, nozzle connecting means for connecting said valve receptacle housing to a fluid injection nozzle, said nozzle connecting means further connecting the valve body to a receptacle cap. A receptacle cap is releasably attached to the receptacle housing at a first end. An inwardly extending shoulder is provided in the receptacle housing at the end adjacent the receptacle cap. A seal piston is disposed within the receptacle housing and axially aligned with the axis of the receptacle housing. A projecting flange of the seal piston engages a cylindrical seal provided the inwardly extending shoulder of the receptacle housing. The cylindrical seal and the projecting flange are provided with inclined surfaces, such surfaces angularly abutting to provide sealing contact of the seal piston flange with the receptacle housing. A seal piston guide having a spring retainer i provided at a second end of the interior of the receptacle housing. The seal piston guide comprises a first hollow cylindrical member adjacent the interior surface of the receptacle housing, and a second hollow cylindrical member interior of the first hollow cylindrical member, and a connecting member connecting the hollow cylindrical member and the interior hollow cylindrical member. A coil spring abuts the first hollow cylindrical member and biases the seal piston flange against the receptacle housing shoulder. A seal piston rod is slidably retained within the interior hollow cylinder of the guide spring and retainer to maintain axial alignment of the piston seal. A shoulder is provided on the seal piston rod. Abutment of the shoulder with the inner hollow cylinder limits the extent of lateral movement of the piston seal. Connection and release means are provided exterior of the receptacle housing for attaching a fuel dispenser. An appropriate fuel dispenser contains a means for engaging the piston seal, projecting the piston seal toward the seal piston guide. A hollow threaded bushing is provided at a second end of the receptacle housing for threadable attachment of the receptacle to tubing or threadable connection means of a storage tank.

DESCRIPTION OF THE DRAWINGS

FIG. 1 depicts a cross-sectional view of the receptacle valve of the present invention showing an attached receptacle cap.

FIG. 2 shows a detail of the sealing connection of the seal piston flange, the receptacle shoulder, and the cylindrical seal of the present invention.

FIG. 3 shows the disassembled component parts of the receptacle valve of the present invention.

FIG. 4 shows a cross-sectional view of the receptacle valve of the present invention with a fluid dispenser engaged.

DETAILED DESCRIPTION OF THE INVENTION

Referring to FIG. 1, a cross-sectional view of the receptacle valve 10 of the present invention is depicted. Receptacle valve 10 comprises a receptacle housing 12, receptacle housing 12 comprising an elongated hollow cylinder of varying internal and external diameter including extensions therefrom which will be discussed in further detail herein.

An inwardly extending shoulder 14 is provided at a first inlet end 15 of receptacle housing 12. End 15 of receptacle housing 12 containing inwardly extending shoulder 14 will be referred to herein as the inlet end of receptacle valve 10 and of receptacle housing 12, and the distal end 17 of receptacle valve 10 and receptacle housing 12 will be referred to as the outlet end.

Receptacle shoulder 14 extends around the interior circumference of inlet end 15 of receptacle housing 14 and defines a reduced diameter inlet opening 16 of receptacle housing 12.

A seal piston 18 is provided interior of receptacle housing 12, seal piston 18 comprising a cylindrical seal body 20, a circumferentially extending seal flange 22, and a cylindrical seal extension 24. Seal extension 24 comprises a cylindrical member concentrically arranged with seal body 20 having an outside diameter less than the outside diameter of seal body 20 and extending in the direction of the inlet end 15 of receptacle housing 12. A concave opening 26 is provided at the central axis of seal extension 24, opening 26 defining a circular indentation at the surface of seal piston extension 24 orient toward inlet end 16.

A piston rod 28 comprising a first cylindrical section 30 from seal piston body 20 and a second cylindrical section 32 extending from first cylindrical section 30 extends from seal piston body 20.

Piston shoulder 36 is defined at the interface of first cylindrical section 30 and second cylindrical section 32 of piston rod 28. The piston rod 28 is concentrically arranged with the axis of seal piston body 20 and extends along the central axis of the cylindrical receptacle housing 12 toward outlet end 17 of receptacle body 12.

A piston retainer 40 is provided near the outlet end of receptacle housing 12. Piston retainer 40 comprises a first outer hollow cylinder 42, an inner hollow cylinder 44, and a connecting member (not shown in FIG. 1, but shown and identified as 46 in FIG. 3) connecting outer cylinder 42 with inner cylinder 44. Inner cylinder 44 is concentrically arranged with respect to outer cylinder 42. An annular space 48 is defined by the exterior of inner hollow cylinder 44 and the interior cavity of outer hollow cylinder 42.

The exterior diameter of outer hollow cylinder 42 is so sized as to fit closely within the inner diameter of an inwardly extending wall section 34 of receptacle housing 12. The central axes of both outer hollow cylinder 42 and inner hollow cylinder 44 coincide with the central axis of cylindrical receptacle housing 12.

Groove 50 is provided in the outer hollow cylinder 42 at the end of outer hollow cylinder 42 oriented towards the inlet end of receptacle housing 12. Groove 50 extends circumferentially around outer hollow cylinder 42.

The second cylindrical section 32 of piston rod 28 is slidably retained within interior hollow cylinder 44.

Still referring to FIG. 1, coil spring 52 is provided interior of receptacle housing 12. Coil spring 52 is so sized as to fit in the groove 50 provided in outer hollow cylinder 42 at a first end of coil spring 52 and to abut against the flange wall 38 of seal piston flange 22.

Seal piston body 20 is so sized in relation to coil spring 52 as to fit within the interior cylinder defined by the coil spring 52. Coil spring 52 is so sized and structured as to normally bias seal piston flange 22 against seal 54 disposed at inwardly extending shoulder 14 of receptacle housing 12.

Inner cap 60 and outer cap 64 are provided at the inlet end 15 of receptacle housing 12. Inner cap 60 comprises a generally cylindrical member containing a threaded exterior section 62. Outer cap 64 comprises a hollow, generally cylindrical body provided with interior threads 66 for threadable connection of outer cap 64 with inner cap 60. Upon threaded connection of inner cap 60 with outer cap 64, inner cap 60 and outer cap 64 define a cap 65 connectable to receptacle housing 12 by means of receptacle housing blades 68 and outer cap extensions 70 in a manner to be further described herein.

Still referring to FIG. 1, a threaded section 72 is provided at the outlet end of receptacle housing 12 on the interior surface of receptacle housing 12. A threaded bushing 74 comprising a hollow cylindrical member having an attachment head 104 is provided with exterior threading 76 for threadable connection to the threaded section 72 of receptacle housing 12. Threaded bushing 74 is provided with interior threading 78 for connection to a hose (not shown) or to a threaded extension (not shown) of a storage tank for fluids received through receptacle valve 12.

A hollow cylindrical ring member 80 is provided interior of receptacle housing 12, said hollow cylindrical ring member 80 being so sized as to fit closely within the interior wall extension at extending wall section 34 of receptacle housing 12 and abutting shoulder 82 of inwardly extending wall section 34. Upon threadable insertion of threaded bushing 74 into receptacle housing 12, ring member 80 is fixedly retained between threaded bushing 74 and shoulder 82. Ring member 80 supports outer hollow cylinder 42 from lateral movement in the direction of the outlet end of receptacle housing 12.

Still referring to FIG. 1, it may be seen that threading 84 is provided exterior of receptacle housing 12 and that an outwardly extending shoulder 86 is provided exterior of receptacle housing 12 adjacent to exterior threading 84. A locking nut 88 comprising a hollow cylindrical member having internal threading so sized as be threadably attachable to exterior threading 84 is provided for threadable connection to receptacle housing 12. A plurality of tapping holes 90 are provided in the exterior surface of locking nut 88 to assist in threaded attachment of threaded locking nut 88 to receptacle housing 12. Exterior threading 84, outwardly extending shoulder 86, and locking nut 88 are provided for fixed attachment of receptacle valve 12 into a cylindrical opening provided in a wall or other structure (not shown in FIG. 1) so arranged as to receive the receptacle housing 12.

Referring now to FIG. 2, a detailed view of seal 54, seal inner surface 56 of seal 54, inwardly extending shoulder 14, seal flange 22, and flange surface 58 of seal flange 22 is shown. Seal 54 is a hollow cylindrical member having an inclined inner surface 56 for abutment with an inclined flange surface 58 of piston flange 22. Seal 54 is so sized as to fit snugly within the receptacle housing 12 with one external surface contiguous with the inner surface of receptacle body 12 and an external surface abutting inwardly extending shoulder 14. Seal piston flange 22 is so sized as to engage flange surface 58 along seal inner surface 56.

As indicated in FIG. 2, the angle of inclination of seal inner surface 56 is a different angle of inclination than the angle of inclination of flange surface 58. The angle of inclination of flange surface 58 is more acute in relation to the central axis of receptacle housing 12 and the corresponding central axis of seal piston 18 than the corresponding angle of inclination of seal inner surface 56. The inclined surfaces of seal inner surface 56 and flange surface 58 allow sealing contact between seal flange 22 and seal 54 through a relatively wide range of relative dimensions of seal flange 22 and seal 54. Such inclined surfaces are important in the cryogenic applications for which this seal is designed. The seal 54 and the seal flange 22 are subject to size variation due to temperature variations from atmospheric temperatures to 259° below zero (259° Fahrenheit) or greater. Such temperature variations result in expansion and contraction of seal flange 22, seal 54, and receptacle body 12. The relatively inclined sealing surfaces, seal inner surface 5 and flange surface 58 allow for effective sealing at the various temperature conditions encountered.

Still referring to FIG. 2, a cross-sectional view of coil spring 52 is shown in the detail of FIG. 2 the coil spring 52 abutting the shoulder 38 of piston flange 22 and extending around seal piston body 20.

Referring now to FIG. 3, a disassembled receptacle valve 10 of the present invention is depicted. Receptacle housing 12 comprising a generally cylindrical member with varying outside and inside diameter is provided at its inlet end 15 with outwardly extending blades 92 for engagement of outer cap extensions 70. In the preferred embodiment depicted, three blades 92 extend outwardly at the inlet en of receptacle housing 12, such blades being evenly spaced circumferentially around receptacle housing 12. Other embodiments may contain a different number of blades 12 and extensions 70.

Outer cap 64 is so sized in relation to receptacle housing 12 as to have an internal diameter larger than the external diameter of receptacle housing 12. Inwardly extending extensions 70 are provided at the lip of outer cap 64 adjacent receptacle housing 12. In the preferred embodiment depicted, three extensions 70 are provided. Extensions 70 and blades 92 are so constructed and sized in relation to each other as to allow the outer cap 64 in a first angular position to slide over the outer surface of receptacle housing 12 with the axially interior surfaces of extensions 70 closely aligned with the exterior surface of receptacle housing 12. Upon such insertion, outer cap 64 may be angularly rotated such that inward extensions 70 engage the rear surfaces 94 of blades 92.

External grooves 108 are provided around the exterior circumference of outer cap 64 to allow for more convenient gripping of outer cap 64 for angular rotation of outer cap 64.

Inner cap 60, outer cap 64, blades 92, and extension 70 are so sized in relation to each other that upon insertion of outer cap 64 and inner cap 60 over receptacle housing 12 and angular adjustment of outer cap 64 engaging extension 70 with the rear surfaces 94 of blades 92, outer cap 64 and inner cap 60 are fixedly attached to receptacle housing 12. Due to the threading of outer cap 64 and inner cap 60, the annular rotation of outer cap 64 draws inner cap 60 against the inlet end 15 of receptacle body 12.

A plurality of rectangular notches 96 are provided at the inlet end 15 of receptacle housing 12. Three such rectangular notches 96 are provided in the preferred embodiment depicted. Corresponding rectangular extensions 98 are provided extending from the inner cap 60 in the direction of receptacle housing 12. Three rectangular extensions 98 are disclosed in the preferred embodiment depicted. Rectangular extensions 98 are so sized in relation to rectangular notches 96 as to closely fit therein upon engagement of inner cap 60 with receptacle housing 12. A cylindrical extension 100 extends from inner cap 60 in the direction of receptacle housing 12. Cylindrical extension 100 is concentrically aligned with the axis of cylindrical body 60. Cylindrical extension 100 is so sized in relation to the inwardly extending shoulder 14 of receptacle housing 12 as to engage said shoulder circumferentially.

Still referring to FIG. 3, threaded exterior section 62 and outwardly extending shoulder 86 of receptacle housing 12 are depicted. Locking nut 88, having tapped holes 90, is provided for threadable attachment to thread 62 as depicted.

Still referring to FIG. 3, seal 54 having inclined inner surface 56 is depicted in relation to receptacle housing 12 and seal piston 18. Seal piston 18 is depicted in relation to seal 54 and coil spring 52. Seal piston 18 includes seal piston body 20, seal piston flange 22, inclined flange surface 58, seal piston extension 24, and piston rod 28 comprising first cylindrical section 30 and second cylindrical section 32 and defining piston shoulder 36.

Still referring to FIG. 3, coil spring 52 comprising a generally cylindrical spring is depicted in relation to seal piston 18 and piston retainer 40. Piston retainer 40 includes an outer hollow cylinder 42 and an inner hollow cylinder 44, inner cylinder 44 being concentric with outer cylinder 42 and defining an annular space 48 between outer cylinder 42 and inner cylinder 44. A connecting member 46 is provided for concentric alignment of inner cylinder 42 with outer cylinder 40.

Still referring to FIG. 3, ring member 80 is shown in relation to threaded bushing 74 and piston retainer 40. As depicted in FIG. 3, ring member 80 is a commercially available snap ring comprising a generally cylindrical band having the ends 81 of which are not connected. The band ends 81 are each slightly expanded and provided with orifices for insertion of pronged pliers to relatively move ends 81.

Threaded bushing 74 comprises a hollow cylindrical member having exterior threading 76 and interior threading 78 and an attachment head 104, said attachment head 104 having planar exterior surfaces suitable for releasable attachment of a wrench.

Still referring to FIG. 3, the construction of the receptacle valve and the correspondence of the various parts thereof are depicted. Inner cap 60 is threadably attached to outer cap 64, outer cap 64 may be quickly engaged to receptacle housing 12 by sliding outer cap 64 over receptacle housing 12 and angularly turning outer cap 64 so that extensions 70 engage blades 92. Receptacle housing 12 may be engaged to a planar surface (not shown in FIG. 3) having a suitably sized orifice by means of locking nut 88 attached to threads 62 containing the planar surface (not shown in FIG. 3) against shoulder 86.

Seal 54 is disposed inwardly of receptacle housing 12 adjacent inwardly extending shoulder 14 (not shown in FIG. 3 of receptacle housing 12). Seal piston 18 is provided inwardly of receptacle housing 12 with flange surface 58 adjacent surface 56 of seal 54. Coil spring 52 is inserted inwardly of receptacle housing 12 and exterior of seal piston body 20 and seal piston rod 28. Piston retainer 40 is inserted inwardly of receptacle housing 12, interior hollow cylinder 44 slidably inserted over cylindrical extension 32 of piston rod 28. Ring member 80 is inserted interior of receptacle housing 12 and fixedly attached against shoulder 82 provided interior of receptacle housing 12 (not shown) and adjacent piston retainer 40, ring member 80 being fixedly retained within receptacle housing 12 by threaded bushing 74.

OPERATION

Referring now to FIG. 4, details of operation of the receptacle valve 10 of the present invention are depicted. Receptacle valve 10 is shown mounted to a planar surface 106 by means of locking nut 88. Inner cap 60 and outer cap 64 are not depicted in FIG. 4. Dispensing nozzle 110 is depicted in FIG. 4 attached to receptacle housing 12. Dispensing nozzle 110 has an outer nozzle cap 112 similarly configured to outer cap 64 as previously described herein, said outer nozzle cap 112 having inwardly extending extensions 114 for engaging blades 92 in a quick release fashion as previously described with reference to outer cap 64. The dispensing nozzle 110 further includes an inner nozzle cap 116 threadably connected to the outer nozzle cap. Inner nozzle cap 116 is a hollow cylindrical member having an inner opening 118 provided to allow for the flow of fluids therethrough. Dispensing nozzle 110 is provided with a plunger 120 for engaging the concave opening 26 provided in seal piston extension 24. Upon attachment of dispensing nozzle 110 to receptacle housing 12 by means of outer nozzle cap 112 and plunger 120. The means of engagement of plunger 120 are not depicted as such means are not relevant to the subject matter of the present invention.

Upon engagement of plunger 120 with concave opening 26 of seal piston 18 with sufficient force to overcome the biasing effect of coil spring 52, seal piston 18 is laterally displaced, such lateral displacement being away from the inlet end 15 of receptacle housing 12 and towards the outlet end 17 of receptacle housing 12. Such displacement is confined to lateral displacement by the slidable connection of second cylindrical section 32 of piston rod 28 within inner hollow cylinder 44. The extent of lateral displacement of seal piston 18 is limited by the engagement of piston shoulder 36 with the end of hollow cylinder 44 disposed towards the inlet end 15 of receptacle housing 12.

Upon displacement of seal piston 18, fluid flow occurs through the opening 118 provided in dispensing nozzle 110, through opening 16 at the inlet end 15 of receptacle housing 12, through the various coils of coil spring 52, through the annular space 48 and through threaded bushing 74 into a hose (not shown) threadably connected to threaded bushing 74 or to other receptacle means threadably connected to threaded bushing 74. Upon disengagement of plunger 120, coil spring 52 again biases seal piston flange 22 against seal 54 thereby terminating the flow of fluid through the receptacle housing 12.

The valve receptacle disclosed is oriented to cryogenic application requiring safe and relatively quick transfer of cryogenic fluid from a dispensing source to a receptacle source. For a cryogenic application such as the transfer of liquified natural gas, preferred materials for construction of components include aluminum for the receptacle housing, stainless steel for the piston, spring, piston retainer, and snap ring, and ultra-high molecular weight polymer material for the inner cap and outer cap. Seal 54 may be constructed of a material that will maintain structural integrity at −259° Fahrenheit such as TEFLON (polytetraflouroethylene) or KEL-F (polytrifluorochloroethylene). TEFLON is a registered trademark of E. I. DuPont de Nemours & Co., Inc.; KEL-F is a registered trademark of 3M Corporation.

The flow of cryogenic fluid through a valve receptacle such as valve receptacle 10 results in extreme temperature variation of the receptacle valve 10 and its component parts. The details of construction of the seal 54 in relation to piston flange 22 is important as the relatively inclined surfaces of seal inner surface 56 and flange surface 58 providing an effective seal whether the seal piston flange 22 has a relatively expanded diameter at environmental temperatures or a relatively contracted diameter resulting from the reduction of temperature of the piston flange due to the temperature of the cryogenic fluid being transferred. The extent of relative expansion and contraction of seal piston flange 22 is determined by the choice of materials for seal piston flange 22 and the temperature variation induced by the introduction of cryogenic fluid through the receptacle valve 10.

It should be noted that the receptacle valve 10 described in the preferred embodiment describes for illustration purposes flow from the dispensing nozzle 110 through inlet end 15 to outlet end 17. It should also be noted that the receptacle valve 10 may be used for fluid flow in the opposing direction without departing from the description and principles described herein, the seal piston 18 being mechanically activated.

I claim:

1. A valve for transfer of cryogenic material comprising in combination
    a housing defining an interior chamber;
    said chamber having a central axis;
    a seal disposed in said chamber;
    a valve piston moveable along said central axis between a first valve closed position abutting said seal and a second valve open position removed from said seal;
    said piston including a piston body, a rod extending axially from said piston body, said rod aligned with said central axis, and a flange extending radially from said piston body;
    said flange having a flange edge defined by a first flange end surface generally perpendicular to said central axis and a second flange side surface;
    an inclined surface of the seal abutting the flange edge in the first valve closed position;
    said seal inclined surface inclined in relation to said flange side surface;
    said seal inclined surface sealingly engageable with said flange edge at multiple locations along said inclined surface;
    said flange having a first diameter at atmospheric temperature;
    said flange having a second relatively reduced diameter at a second reduced temperature induced by cryogenic fluid flow;
    whereby sealing engagement is obtained between said flange edge and said inclined surface in the valve closed position at said atmospheric temperature and sealing engagement is obtained between said flange edge and said inclined surface in the valve closed position at said second reduced temperature.

2. The valve according to claim 1 wherein
said flange side surface is inclined in relation to the central axis; and
the angle of inclination of said seal inclined surface in relation to said central axis is greater than the angle of inclination of said flange side surface.

3. The valve according to claim 1 including
alignment means for maintaining alignment of the valve piston with the housing central axis, said alignment means comprising an outer hollow cylinder disposed against the housing; an inner hollow cylinder disposed interior of and concentric to said outer hollow cylinder, and a connecting member connecting said outer hollow cylinder and said inner hollow cylinder;
said piston rod slidably moveable in said inner hollow cylinder;
spring means disposed between said piston body and said alignment means to normally bias said piston in the first valve closed position;
whereby fluid flow is provided between said outer hollow cylinder and said inner hollow cylinder in the valve open position.

4. The valve according to claim 3 wherein an outwardly-extending shoulder is provided on the piston rod;
said outwardly-extending shoulder engaging said alignment means after displacement of the valve piston to the valve open position thereby limiting displacement of the valve piston.

5. The valve according to claim 8 wherein
the diameter of the piston flange is substantially greater than the diameter of the piston rod.

6. The valve according to claim 5 wherein
first coupling means are provided at a housing first opening for connection of the housing to first fluid transfer means and second coupling means are provided at a housing second opening for connection of the housing to second fluid transfer means.

7. The valve according to claim 1 wherein
said flange side surface is inclined in relation to the central axis;

the angle of inclination of said seal inclined surface in relation to said central axis is greater than the angle of inclination of said flange side surface.

8. A valve for transfer of cryogenic material comprising in combination
    an elongated housing, an inner wall of said housing defining an interior chamber;
    a first opening provided in a first end of said housing;
    a second opening provided in a second end of said housing;
    a chamber central axis between said first opening and said second opening;
    an inwardly-extending housing shoulder extending from the housing inner wall near the first end;
    a circumferentially-extending seal disposed in said chamber;
    a first external surface of said seal abutting the inwardly-extending housing shoulder;
    a second external surface of the seal abutting the housing inner wall;
    an inner inclined surface of the seal being inclined in relation to the central axis;
    a valve piston provided interior of said housing;
    said valve piston moveable between a first valve closed position and a second valve open position;
    spring means normally biasing said valve piston in the first valve closed position;
    said valve piston including a cylindrical piston body aligned with the central axis, a rod extending axially from said piston body and a flange extending radially from said piston body;
    said flange having a flange edge defined by a first flange surface generally perpendicular to said central axis and a second flange side surface;
    said seal inclined surface inclined in relation to said flange side surface;
    said seal inclined surface sealingly engageable with said flange edge at multiple locations along said inclined surface;
    said flange having a first diameter at atmospheric temperature;
    said flange having a second relatively reduced diameter at a second reduced temperature induced by flow of cryogenic fluid;
    whereby sealing engagement of said flange edge and said seal inclined surface is obtained in the valve closed position at atmospheric temperature and sealing engagement of said flange edge and said seal inclined surface is obtained at reduced temperatures induced by flow of cryogenic fluid.

9. The valve according to claim 8 including alignment means for maintaining alignment of the valve piston with the housing central axis;
    said alignment means comprising a first outer hollow cylinder disposed against the housing inner wall, a second inner hollow cylinder disposed interior of and concentric to said first outer hollow cylinder, a connecting member for connecting said first outer hollow cylinder and said second inner hollow cylinder, said piston rod slidably moveable in said inner hollow cylinder; and
    said spring means comprising a coil spring disposed between said valve piston and said alignment means.

10. The valve according to claim 9 wherein
    an outwardly-extending shoulder is provided on the piston rod;
    said outwardly-extending shoulder engaging said alignment means after displacement of the valve piston to the valve open position thereby limiting displacement of the valve piston.

11. The valve according to claim 10 wherein
    the diameter of the piston flange is substantially greater than the diameter of the piston rod.

12. The valve according to claim 11 wherein
    attachment means are provided exterior of the housing for attachment of the housing to a support structure, first coupling means are provided at the first opening for connection of the housing to first fluid transfer means, and second coupling means are provided at the second opening for connection of the housing to second fluid transfer means.

* * * * *